United States Patent
McGowan et al.

(10) Patent No.: US 8,504,109 B2
(45) Date of Patent: *Aug. 6, 2013

(54) ANTENNA SYSTEMS WITH COMMON OVERHEAD FOR CDMA BASE STATIONS

(75) Inventors: Neil McGowan, Stittsville (CA); Peter Deane, Fitzroy Harbour (CA)

(73) Assignee: Apple Inc., Cupertino, CA (US)

( * ) Notice: Subject to any disclaimer, the term of this patent is extended or adjusted under 35 U.S.C. 154(b) by 2485 days.

This patent is subject to a terminal disclaimer.

(21) Appl. No.: 09/733,059

(22) Filed: Dec. 11, 2000

(65) Prior Publication Data

US 2002/0072393 A1 Jun. 13, 2002

(51) Int. Cl.
*H04M 1/00* (2006.01)
(52) U.S. Cl.
USPC ............... 455/562.1; 455/422.1; 455/132; 455/277.1; 455/227; 370/320; 370/335; 370/341; 370/441; 370/328
(58) Field of Classification Search
USPC ............ 455/561, 562.1, 422.1, 132, 727, 455/277.1, 448, 277.2, 227, 562, 1; 342/153, 342/359, 360, 381, 81, 117, 154, 354; 370/320, 370/335, 342, 441, 341, 328
See application file for complete search history.

(56) References Cited

U.S. PATENT DOCUMENTS

| | | | | |
|---|---|---|---|---|
| 4,652,879 A | * | 3/1987 | Rudish et al. | 342/371 |
| 4,723,266 A | * | 2/1988 | Perry | 455/446 |
| 5,317,623 A | * | 5/1994 | Sakamoto et al. | 455/436 |
| 5,493,306 A | | 2/1996 | Rudish et al. | 342/371 |
| 5,515,509 A | * | 5/1996 | Rom | 709/228 |
| 5,818,814 A | * | 10/1998 | Testani et al. | 370/212 |
| 5,832,389 A | | 11/1998 | Dent | 455/562 |
| 6,072,788 A | * | 6/2000 | Peterson et al. | 370/337 |
| 6,141,335 A | | 10/2000 | Doi et al. | |
| 6,141,542 A | * | 10/2000 | Kotzin et al. | 455/101 |
| 6,157,612 A | | 12/2000 | Weerackody et al. | 370/215 |
| 6,161,010 A | * | 12/2000 | Oguri | 455/423 |
| 6,173,005 B1 | * | 1/2001 | Kotzin et al. | 375/141 |
| 6,185,440 B1 | * | 2/2001 | Barratt et al. | 455/562.1 |
| 6,289,228 B1 | * | 9/2001 | Rotstein et al. | 455/574 |
| 6,320,853 B1 | * | 11/2001 | Wong et al. | 370/328 |

(Continued)

FOREIGN PATENT DOCUMENTS

| | | |
|---|---|---|
| EP | 0798872 | 3/1997 |
| GB | 2300549 | 4/1996 |

(Continued)

*Primary Examiner* — Nghi H Ly
(74) *Attorney, Agent, or Firm* — Mayertons, Hood, Kivlin, Kowert & Goetzel, P.C.

(57) ABSTRACT

Antenna systems are used for transmitting common overhead channels (pilot, sync, and paging channels) over a whole sector while transmitting and receiving unique traffic channels on individual beams in the sector. Each beam in the sector is transmitted at a frequency offset from other beams in the sector. The offset frequency is chosen such that the effect of cancellation of the pilot channel caused by the summing of signals from multiple beams is minimized. Alternative, each beam in the sector can have a time dependent phase offset relative to each other to minimize the effect of cancellation of the pilot channel caused by the summing of signals from multiple beams. System capacity is substantially increased since the number of traffic carrying beams per sector is increased without using more pilot channel PN offsets. Beams are fixed and the same antennas are used for the overhead channels as the traffic channels, obviating the need for complex algorithms and calibration procedures.

19 Claims, 3 Drawing Sheets

(56) References Cited

U.S. PATENT DOCUMENTS

| | | |
|---|---|---|
| 6,330,460 B1 | 12/2001 | Wong et al. |
| 6,463,303 B1 | 10/2002 | Zhao |
| 6,606,058 B1 * | 8/2003 | Bonek et al. ................... 342/383 |
| 6,609,008 B1 * | 8/2003 | Whang et al. ................. 455/522 |
| 6,795,424 B1 | 9/2004 | Kapoor et al. |
| 6,804,307 B1 * | 10/2004 | Popovic ........................ 375/299 |
| 6,909,707 B2 | 6/2005 | Rotstien et al. |
| 6,922,435 B2 | 7/2005 | Neufeld et al. |
| 7,130,339 B2 * | 10/2006 | Frank ............................ 375/225 |
| 2001/0034236 A1 | 10/2001 | Tong et al. |
| 2002/0034270 A1 | 3/2002 | Ylitalo |
| 2002/0072393 A1 | 6/2002 | Deane et al. |
| 2003/0022635 A1 | 1/2003 | Benning et al. |
| 2003/0087640 A1 | 5/2003 | Jiangnan et al. |
| 2004/0092291 A1 * | 5/2004 | Legnain et al. ............ 455/562.1 |
| 2004/0102203 A1 | 5/2004 | Tiirola et al. |

FOREIGN PATENT DOCUMENTS

| | | |
|---|---|---|
| GB | 2335572 | 8/1998 |
| JP | 05-043260 | 2/1993 |
| JP | 07-212828 | 8/1995 |
| JP | 10-322408 | 12/1998 |
| JP | 11-068696 | 3/1999 |
| JP | 11-088941 | 3/1999 |
| WO | 9940648 | 2/1999 |
| WO | 0139395 | 5/2001 |
| WO | 0189112 | 5/2001 |
| WO | 0199240 | 6/2001 |

* cited by examiner

ANTENNA SYSTEMS WITH COMMON OVERHEAD FOR CDMA BASE STATIONS

This invention relates in general to CDMA cellular communication systems and in particular to methods and apparatus for increasing the capacity of such systems.

BACKGROUND

CDMA digital cellular systems are currently in widespread use throughout North America providing telecommunications to mobile users. In order to meet the demand for transmission capacity within an available frequency band allocation, CDMA digital cellular systems divide a geographic area to be covered into a plurality of cell areas. Within each cell is positioned a base station with which a plurality of mobile stations within the cell communicate.

In general, it is desired to have as few base stations as possible, since base stations are expensive, and require extensive effort in obtaining planning permission, and in some areas, suitable base station sites may not be available. In order to have as few base stations as possible, each base station ideally has as large a capacity as possible in order to service as large a number of mobile stations as possible. The key parameters that determine the capacity of a CDMA digital cellular system are: processing gain, ratio of energy per bit to noise power, voice activity factor, frequency reuse efficiency and the number of sectors in the cell-site antenna system.

One method of achieving an increase in capacity is to replace a wide beam width antenna with an antenna array that allows the formation of a number of narrower beam widths that cover the area of the original beam. Referring to FIG. 1, a conventional CDMA communication cell 100 is shown comprising 3 adjacent hexagonal sectors, alpha 102, beta 104 and gamma 106. Each cell comprises an antenna tower platform 120 located at the intersection of the 3 sectors. The antenna tower platform 120 has 3 sides forming an equallateral triangle. Each sector has 3 antennas (only antennas in sector alpha 102 shown) a first antenna 114, a second antenna 116 and third antenna 112 mounted on a side of the antenna tower platform 120. Each sector also has 3 beams (only beams in sector alpha 102 shown) a first beam 108, a second beam 110 and a third beam 112. The 3 beams 108, 110, 112 are adjacent with some overlap. The 3 sectors alpha 102, beta 104 and gamma 106 are identical in structure with respect to antennas and beams. The signal for a particular user can then be sent and received only over the beam or beams that are useful for that user. If the pilot channel on each beam is unique (i.e. has a different PN (pseudo-random noise) offset) within each sector then the increase in capacity is limited due to interference between reused pilot channels in different cells.

An improvement is to use multiple narrow beams for the traffic channels and transmit the overhead channels (pilot, sync, and paging channels) over the whole sector so that the pilot channel is common to all the narrow beams used by the traffic channels in that sector. This leads to substantial gains in capacity. For example, a change from a system with a single beam per sector to a system with 3 beams per sector with a common pilot channel yields a 200 to 300% increase in capacity. It is therefore desirable that the pilot channel be broadcast over the area covered by the original wide beam. A possible arrangement is to use multiple beams per sector for the traffic channels and transmit the overhead channels over a separate wide beam antenna covering the whole sector. However, this requires the expense of extra hardware as well as the calibration and adjustment needed to match the phase of the pilot channel with the phase of the traffic channels over time and temperature.

Another possible solution is to use adaptive antenna array techniques to transmit and receive multiple narrow beams for the traffic channels and transmit the overhead channels over the whole sector on the same antenna array. However, this requires complex calibration equipment and algorithms.

Yet another solution is to use an antenna array that transmits and receives multiple sectors over fixed narrow beams for the traffic channels and transmit the pilot channel on the same fixed narrow beams. However, the problem with this approach is that the strength of the pilot channel signal at any point in the sector is determined by the vector sum of all of the pilot channel signals from each beam. Since the pilot channel signals from each beam are coherent, areas where the vector sum of the pilot channel signals is null or severely degraded will occur. This can result in dropped calls when a mobile station enters one of these areas.

There is thus an advantage to provide an antenna array that uses fixed narrow beams for transmitting and receiving the traffic channels on multiple beams and can broadcast the common pilot channel over all of the sector using the same antenna array. Furthermore, it would be advantageous to provide an antenna system that did not require complex calibration and adjustment to maintain performance over time and temperature.

SUMMARY

The invention may be summarized according to a first broad aspect as an antenna system having multiple antennas defining a respective plurality of fixed beams that together cover a sector and are connected to a beam-forming matrix. Transceivers are connected respectively to the beam-forming matrix to drive the plurality of antennas, with signals comprising common overhead channels. The signals may be IS-95, IS-2000 or any other similar CDMA communications standard designed for terrestrial cellular communications. In accordance with this first broad aspect the transceivers provide transmit frequencies that are slightly offset from one another. The offsets are chosen such that undesirable effects of the signal cancellation are reduced. More particularly, the offsets are chosen such that the overall system performance is optimized.

The invention may be summarized according to a second broad aspect as an antenna system having multiple antennas defining a respective plurality of fixed beams that together cover a sector and are connected to a beam-forming matrix. The transceivers are connected respectively to the beam-forming matrix to drive the plurality of antennas, with signals comprising common overhead channels. The signals may be IS-95, IS-2000 or any other similar CDMA communications standard designed for terrestrial cellular communications. In accordance with this second broad aspect the transceivers provide transmit phases that have time dependent offsets with respect to one another. The offsets are chosen such that undesirable effects of the signal cancellation are reduced. More particularly, the offsets are chosen such that the overall system performance is optimized.

The invention may be summarized according to a third broad aspect as an antenna system having a digital beam former connected to a plurality of transceivers and a plurality of antennas defining a respective plurality of fixed beams that together cover a sector. The transceivers are connected to the plurality of antennas to drive them with signals comprising common overhead channels. The signals may be IS-95, IS-2000 or any other similar CDMA communications standard designed for terrestrial cellular communications. In accordance with this third broad aspect the transceivers provide transmit frequencies that are slightly offset from one another. The offsets are chosen such that undesirable effects of the signal cancellation are reduced. More particularly, the offsets are chosen such that the overall system performance is optimized.

The invention may be summarized according to a fourth broad aspect as an antenna system having a digital beam former connected to a plurality of transceivers and a plurality of antennas defining a respective plurality of fixed beams that together cover a sector. The transceivers are connected to the plurality of antennas to drive them with signals comprising common overhead channels. The signals may be IS-95, IS-2000 or any other similar CDMA communications standard designed for terrestrial cellular communications. In accordance with this fourth broad aspect the transceivers provide transmit phases that have time dependent offsets with respect to one another. The offsets are chosen such that undesirable effects of the signal cancellation are reduced. More particularly, the offsets are chosen such that the overall system performance is optimized.

Advantageously, the ability to use a plurality of fixed beams with common overhead channels results in a significant increase in system capacity.

Other aspects and features of the present invention will become apparent to those ordinarily skilled in the art upon review of the following description of the specific embodiments of the invention in conjunction with the accompanying figures.

DETAILED DESCRIPTION OF THE PREFERRED EMBODIMENTS

In order to transmit and receive unique traffic channels on each beam in a sector while transmitting common overhead channels (pilot, sync, and paging channels) over all of the beams in the sector an antenna system using fixed narrow beams that does not require complex calibration equipment and algorithms is provided.

Figure 1:
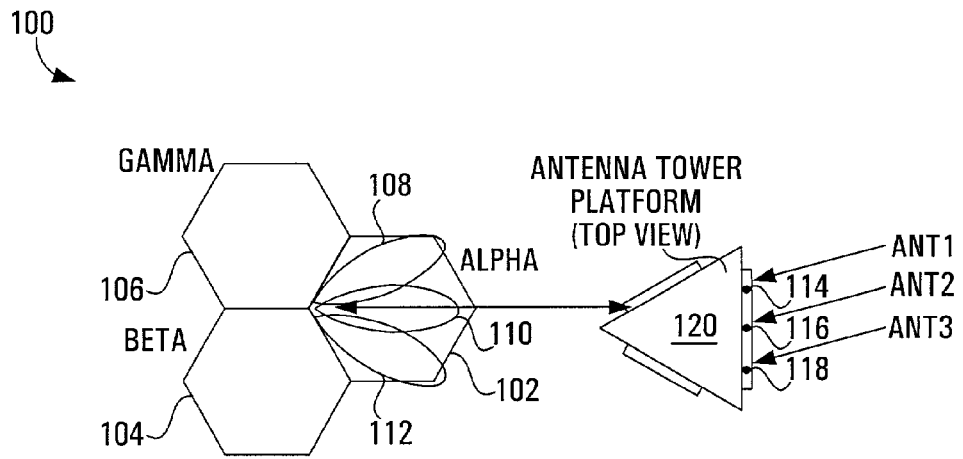
FIG. 1 is a diagram of a conventional tri-cellular CDMA communication cell modified to show 3 narrows beams in place of the normal single wide beam per sector.
Figure 2A:
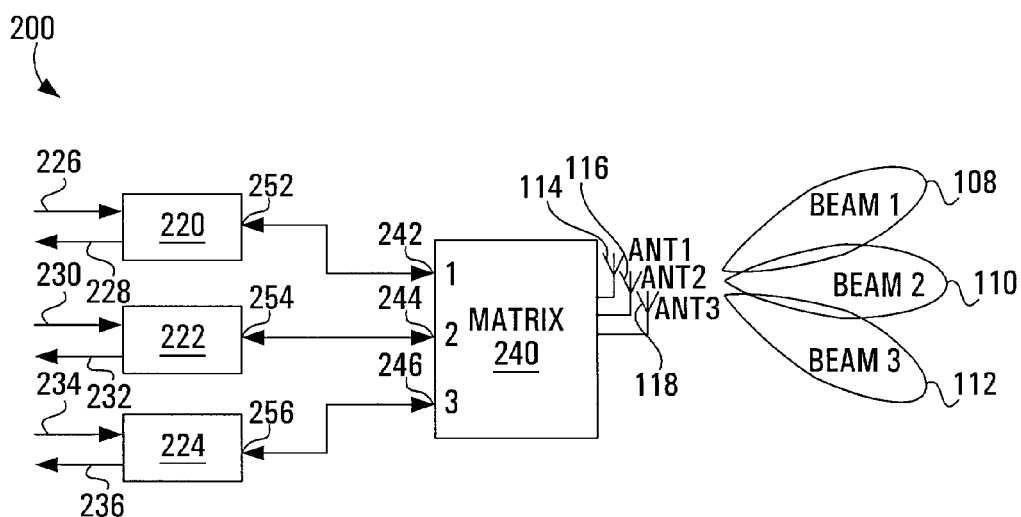
FIG. 2A is a diagram of an antenna system of sector alpha of the CDMA communication cell of FIG. 1.

To this end, FIG. 2A shows a conventional antenna system 200 that is within sector alpha 112. The sectors beta 104 and gamma 106 have identical antenna systems. The antenna system 200 defines a first beam 108, a second beam 110 and a third beam 112. The three beams 108, 110, 112 are radiation/reception patterns formed by a first antenna 114, a second antenna 116 and a third antenna 118 respectively. The three antennas 114, 116, 118 are connected to a beam-forming matrix 240 that may be, for example, a Butler matrix. The beam-forming matrix 240 comprises three bi-directional ports: a first port 242, a second port 244 and a third port 246. The input signals of the first port 242, the second port 244 and the third port 246 are transmitted on the first beam 108, the second beam 110 and the third beam 112 respectively. The signals received on the first beam 108, the second beam 110 and the third beam 112 are the outputs of the first port 242, the second port 244 and the third port 246 respectively. The antenna system 200 also comprises a first transceiver 220, a second transceiver 222 and third transceiver 224. The first transceiver 220 has an input 226, an output 228 and a bi-directional port 252. The second transceiver 222 has an input 230, an output 232 and a bi-directional port 254. The third transceiver 224 has an input 234, an output 236 and a bi-directional port 256. The first port 242, second port 244 and third port 246 of the beam-forming matrix 240 are connected to bi-directional port 252 of the first transceiver 220, bi-directional port 254 of the second transceiver 222 and bi-directional port 256 of the third transceiver 224 respectively.

Figure 2B:
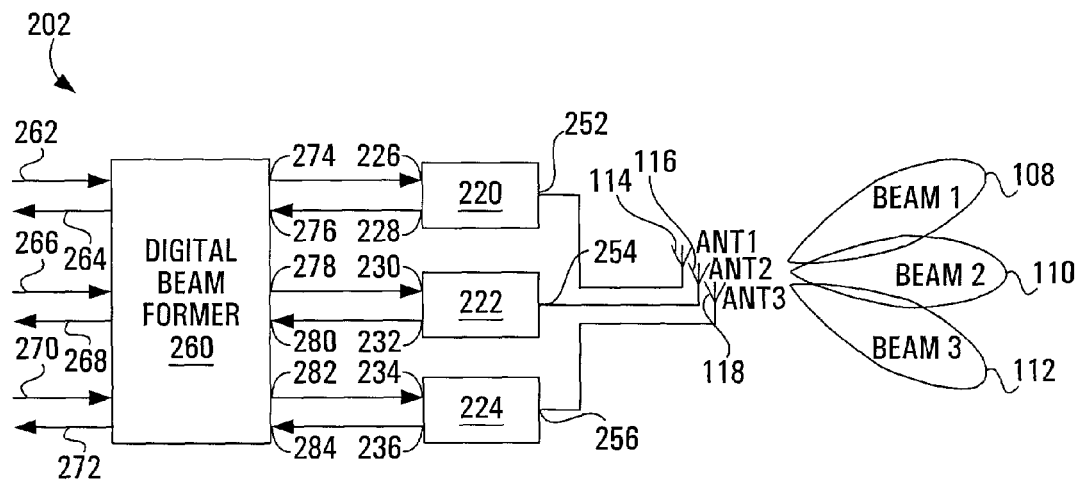
FIG. 2B is a diagram of an alternative antenna system of sector alpha of the CDMA communication cell of FIG. 1.

FIG. 2B shows another conventional antenna system 202 that may be deployed within sector alpha 112. The antenna system 202 defines a first beam 108, a second beam 110 and a third beam 112. The three beams 108, 110, 112 are radiation/reception patterns formed by a first antenna 114, a second antenna 116 and a third antenna 118 respectively. The antenna system 202 also comprises a first transceiver 220, a second transceiver 222 and third transceiver 224. The first transceiver 220 has an input 226, an output 228 and a bi-directional port 252. The second transceiver 222 has an input 230, an output 232 and a bi-directional port 254. The third transceiver 224 has an input 234, an output 236 and a bi-directional port 256. The three antennas 114, 116, 118 are connected to the three respective bi-directional ports 252, 254, 256 of the transceivers 220, 222, 224. The antenna system 202 also comprises a digital beam former 260 that has a first input 262, a first output 268, a second input 266, a second output 268, a third input 270, a third output 272, a first beam output 274, first beam input 276, a second beam output 278, a second beam input 280, a third beam output 282 and a third beam input 284. The first beam output 274 and input 276 of the digital beam former 260 are connected the input 226 and output 228 of the first transceiver 220 respectively. The second beam output 278 and input 280 of the digital beam former 260 are connected the input 230 and output 232 of the second transceiver 222 respectively. The third beam output 282 and input 284 of the digital beam former 260 are connected the input 234 and output 236 of the third transceiver 220 respectively.

Although three antennas forming three beams per sector are used in this example of the preferred embodiment, any number of antennas and beams per sector greater than one may be used while remaining within the scope of the invention.

Figure 3:
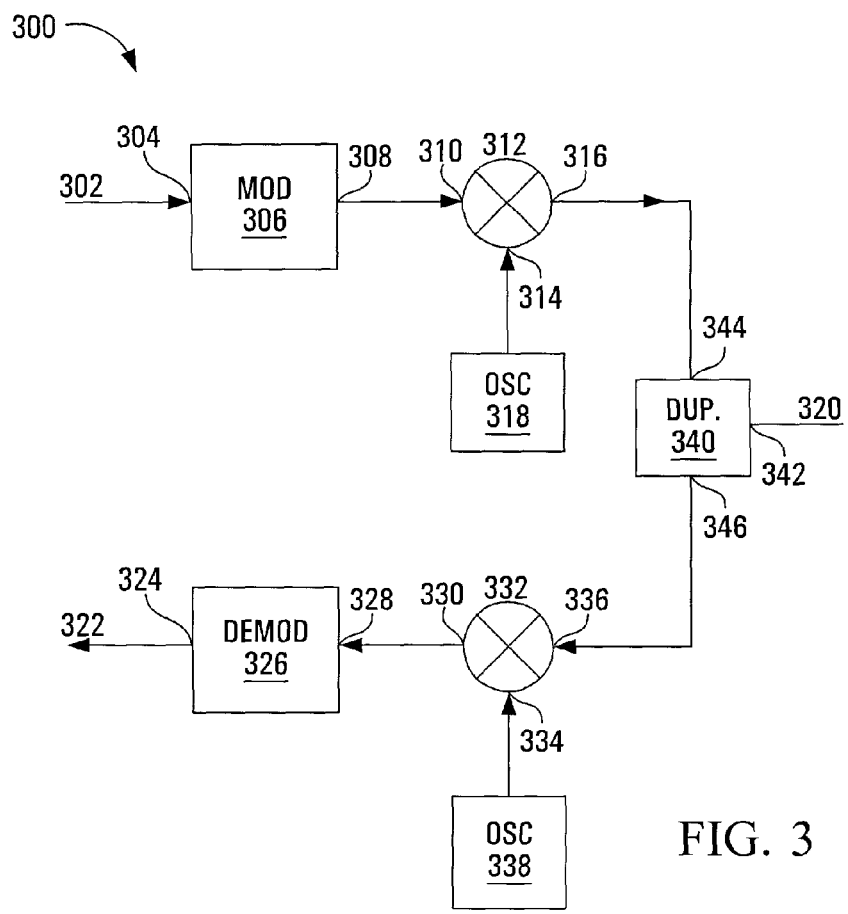
FIG. 3 is a diagram showing a transceiver of FIGS. 2A and 2B in greater detail.

The transceivers 220, 222, 224 of FIGS. 2A and 2B are identical in design and are described in greater detail with respect to FIG. 3. For ease of description the transceiver shown in FIG. 3 is given the reference number 300. Transceiver 300 has its input 302 connected to an input of a modulator 306. The modulator 306 has an output 308 that is connected to a first input 310 of an up-converter 312. The up-converter 312 also has a second input 314 and an output 316. The second input 314 of the up-converter 312 is connected to an oscillator 318 that may be, for example, a digital frequency synthesizer. The output 316 of the up-converter 312 is connected to an input 344 of a duplexor 340 having a bi-directional port 342 connected to the bi-directional port 320 of the transceiver 300. The transceiver 300 also has an output 322 connected to an output 324 of a demodulator 326. The demodulator also has an input 328 that is connected to an output 330 of a down-converter 332. The down-converter 332 also has a first input 334 and a second input 336. The first input 334 of the down-converter 332 is connected to an oscillator 338 and the second input 336 of the down-converter 332 is connected to an output 346 of the duplexer 340. The up-conversion stage of the transceiver 300, comprising the up-converter 312 and oscillator 318, are shown as a single stage for convenience. In reality the up-conversion may be done in a plurality of stages. Similarly, the down-conversion stage of the transceiver 300, comprising the down-converter 332 and oscillator 338, are shown as a single stage for convenience. In reality the down-conversion may be done in a plurality of stages.

Referring to FIG. 2A, the signals on input 226, input 230 and input 234 of transceiver 220, transceiver 222 and transceiver 224 respectively are digital baseband signals that are transmitted on the first beam 108, the second beam 110 and the third beam 112 respectively. The signals on output 228, output 232 and output 236 of transceiver 220, transceiver 222 and transceiver 224 respectively are digital baseband signals that are received on the first beam 108, the second beam 110 and the third beam 112 respectively.

The digital baseband signals on input 226, input 230 and input 234 of transceiver 220, transceiver 222 and transceiver 224 respectively may be any CDMA standard digital data stream adapted to be received by a plurality of mobile stations (not shown) within the area covered by the first beam 108, the second beam 110 or the third beam 112.

Similarly, referring to FIG. 2B, the signals on input 262, input 266 and input 270 of the digital beam former 260 are digital baseband signals that are transmitted on the first beam 108, the second beam 110 and the third beam 112 respectively. The signals on output 264, output 268 and output 272 of the digital beam former 260 are digital baseband signals that are received on the first beam 108, the second beam 110 and the third beam 112 respectively.

The digital baseband signals on input 262, input 266 and input 270 of the digital beam former 260 may be any CDMA standard digital data stream adapted to be received by a plurality of mobile stations (not shown) within the area covered by the first beam 108, the second beam 110 or the third beam 112.

The frequency of the oscillator 318 in transceiver 222 is chosen such that the frequency of the output 316 of the up-converter 312 in the transceiver 222 is a standard IS-95 base station transmit frequency, $f_c$. The frequency of the oscillator 318 in the transceiver 220 is chosen such that the frequency of the output 316 of the up-converter 312 in the transceiver 220 is $f_c$ plus an offset frequency, $f_o$. The frequency of the oscillator 318 in the transceiver 224 is chosen such that the frequency of the output 316 of the up-converter 312 in the transceiver 224 is $f_c$ minus the offset frequency, $f_o$. For example, if $f_c$=1940 MHz and $f_o$=40 Hz, then the frequency output of the up-converter 312 in the transceiver 222 equal to 1940 MHz, the frequency output of the up-converter 312 in the transceiver 220 is equal to 1940.00004 MHz and the frequency output of the up-converter 312 in the transceiver 224 is 1939.99996 MHz.

Figure 4A:
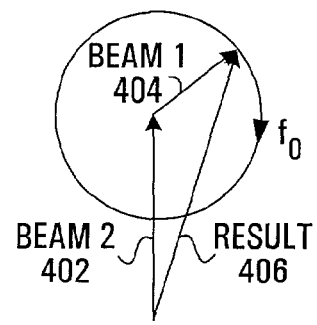
FIGS. 4A and 4B are diagrams showing the vector addition of signals from the first beam and the second beam.
Figure 4B:
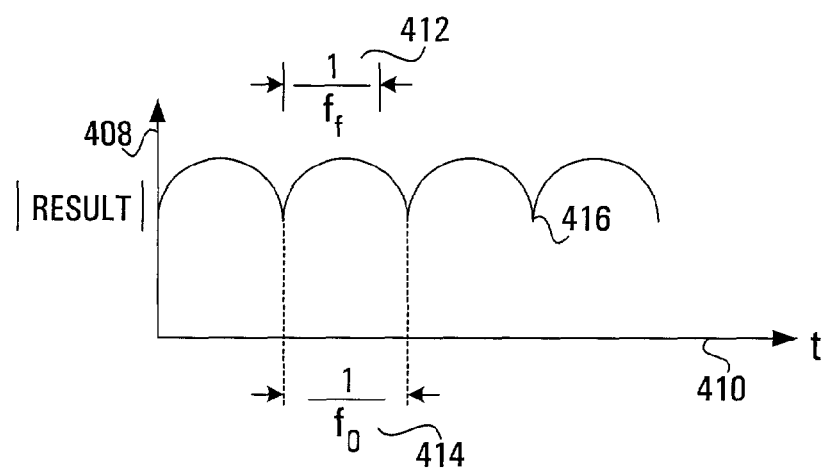

The signal strength of the pilot channel at any point in the sector is determined by the vector sum of all of the pilot channel signals from each beam. For example, referring to FIG. 4A, the signal at a point from the second beam 110 is represented by vector 402. The signal at the same point from the first beam 108 is represent by vector 404. Since the frequency of the signal transmitted on the first beam 108 is offset by $f_o$ from the frequency of the second beam 110, the vector 404 rotates with respect to vector 402 and hence, the magnitude of resultant vector 406 will fluctuate with a $1/f_o$ time period. FIG. 4B shows a plot of the magnitude 408 of the result vector 406 versus time 410. Due to the rotation of vector 404 a minimum 416 value occurs every $1/f_o$ 414. In an IS-95 forward channel, the frame rate $f_f$ is 50 frames per second or a period of 20 ms. Also, each IS-95 frame is repeated once. Therefore the offset frequency $f_o$ is chosen such that $1/f_o$ 414 is not a multiple of $1/f_f$ 412. This will prevent a minimum 416 from occurring at the same point in two consecutive frames thus significantly reducing the error rate.

Since the magnitude of the resultant vector 406 fluctuates with a $1/f_o$ time period, $f_o$ is chosen by empirical methods such that the overall system performance is optimized. The optimum value of $f_o$, for each base station, is influenced by environmental factors, the maximum velocity of the mobile stations, the frequency band and the over-the-air interface. Typically $f_o$ is greater than 30 Hz and less than 120 Hz for a IS-95 CDMA communication system. Other over-the-air interface standards may have optimum performance at different values of $f_o$.

The frequencies of oscillator 338 in transceiver 220, oscillator 338 in transceiver 222 and oscillator 338 in transceiver 224 are identical and chosen such that IS-95 signals at standard frequencies are down-converted and demodulated.

The traffic channels on each beam are unique and uncorrelated so that no cancellation of the traffic channels occurs.

In an alternative embodiment, the waveform of the oscillator 318 in transceiver 222 is chosen such that the waveform of the output 316 of the up-converter 312 in the transceiver 222 is a standard IS-95 base station transmit frequency, $f_c$. The waveform of the oscillator 318 in the transceiver 220 is chosen such that the waveform of the output 316 of the up-converter 312 in the transceiver 220 is $f_c$ with a time dependent phase offset within a range of −180° to 180°. The waveform of the oscillator 318 in the transceiver 224 is chosen such that the waveform of the output 316 of the up-converter 312 in the transceiver 224 is $f_c$ with time dependent phase offset within a range of −180° to 180°. The waveform of the output 316 of the up-converter 312 in the transceiver 222 is the reference for 0° phase. The time dependent phase offset within may be sinusoidal, random or any other pattern that results in the phases of the output of oscillator 318 in the transceiver 220, the output of oscillator 318 in the transceiver 222 and the output of oscillator 318 in the transceiver 224 being incoherent. Hence, the phases of the first beam 108, the second beam 110 and the third beam 112 are incoherent.

In the preferred embodiment the signals on input 226, input 230 and input 234 of transceiver 220, transceiver 222 and transceiver 224 respectively have identical IS-95 overhead channels (pilot, synchronization and paging channels) and unique IS-95 traffic channels corresponding to mobile station(s) (not shown) that are transmitting/receiving on the first beam 108, the second beam 110 and the third beam 112 respectively. Mobile stations that move from beam to beam or are in an area of overlapping beams are handled by IS-95 handoff procedures.

In an alternative embodiment the signals on input 226, input 230 and input 234 of transceiver 220, transceiver 222 and transceiver 224 respectively have identical IS-2000 overhead channels and unique IS-2000 traffic channels corresponding to mobile station(s) (not shown) that are transmitting/receiving on the first beam 108, the second beam 110 and the third beam 112 respectively. Mobile stations that move from beam to beam or are in an area of overlapping beams are handled by IS-2000 handoff procedures.

It should be noted that while an embodiment of the invention using a Butler matrix 240, as shown in FIG. 2A, does not require a calibration scheme to compensate for differential phases between the transceivers, an embodiment using a digital beam former 260, as shown in FIG. 2B, does require a calibration scheme to compensate for differential phases between the transceivers.

Advantageously, the invention may be used with antenna systems employing diversity schemes, such as space diversity or polarization diversity. In all diversity schemes all overlapping beams should have offset frequencies or time dependent phase offsets.

While the preferred embodiment of the present invention has been described and illustrated, it will be apparent to persons skilled in the art that numerous modifications and variations are possible. The scope of the invention, therefore, is only to be limited by the claims appended hereto.

The invention claimed is:

1. An antenna system for a Code Division Multiple Access (CDMA) base station comprising:
   a plurality of antennas defining a respective plurality of fixed beams which together cover a sector and connectable to a beam-forming matrix; and
   a plurality of transmitters connectable to the beam-forming matrix to drive the plurality of antennas with respective CDMA signals, each CDMA signal including traffic channels unique to the respective transmitter and overhead channels common to all transmitters in the plurality of transmitters, the transmitters being arranged to transmit the CDMA signals over respective transmit frequencies that are offset from one another,
   wherein the signals are any CDMA communications standard format that employs a redundant forward channel frame structure having a frame rate,
   wherein the offset is a multiple other than that of the frame rate.

2. The antenna system of claim 1 wherein the beam-forming matrix is a Butler matrix.

3. The antenna system of claim 1 wherein the offset is chosen to be sufficient so as to reduce undesirable effects of signal cancellation.

4. The antenna system of claim 3 wherein the reduction in undesirable effects of signal cancellation includes a reduction in error rate.

5. The antenna system of claim 1 wherein there are three antennas and three transmitters.

6. The antenna system of claim 1 wherein the offset is greater than 30 Hz and less than 120 Hz.

7. An antenna system for a Code Division Multiple Access (CDMA) base station comprising:
   a plurality of antennas defining a respective plurality of fixed beams which together cover a sector and connectable to a beam-forming matrix;
   a plurality of transmitters connectable to the beam-forming matrix to drive the plurality of antennas with respective CDMA signals, each CDMA signal including traffic channels unique to the respective transmitter and overhead channels common to all transmitters in the plurality of transmitters; and
   means in the transmitters for transmitting the CDMA signals over respective transmit frequencies that offset from one another,
   wherein the signals are any CDMA communications standard format that employs a redundant forward channel frame structure having a frame rate,
   wherein the offset is a multiple other than that of the frame rate.

8. The antenna system of claim 7 wherein the offset is chosen to be sufficient so as to reduce undesirable effects of signal cancellation.

9. In an antenna system for a Code Division Multiple Access (CDMA) base station having a plurality of antennas defining a respective plurality of fixed beams which together cover a sector, a method of transmitting CDMA signals from a plurality of transmitters, each CDMA signal including traffic channels unique to the respective transmitter and overhead channels common to all transmitters in the plurality of transmitters, the method comprising up-converting the signals in the transmitters to transmit the CDMA signals over respective transmit frequencies that are offset from one another,
   wherein the signals are any CDMA communications standard format that employs a redundant forward channel frame structure having a frame rate,
   wherein the offset is a multiple other than that of the frame rate.

10. A transceiver in an antenna system for a Code Division Multiple Access (CDMA) base station comprising a transmitter adapted to up-convert a CDMA signal including unique traffic channels and common overhead channels to transmit the CDMA signal over a respective transmit frequency that is offset from a standard base station transmit frequency,
    wherein the signals are any CDMA communications standard format that employs a redundant forward channel frame structure having a frame rate,
    wherein the offset is a multiple other than that of the frame rate.

11. An antenna system for a Code Division Multiple Access (CDMA) base station comprising:
    a digital beam former connectable to a plurality of transmitters; and
    a plurality of antennas defining a respective plurality of fixed beams which together cover a sector and connectable to the plurality of transmitters to be driven with respective CDMA signals, each CDMA signal including traffic channels unique to the respective transmitter and overhead channels common to all transmitters in the plurality of transmitters, the transmitters being arranged to transmit the CDMA signals over respective transmit frequencies that are offset from one another,
    wherein the signals are any CDMA communications standard format that employs a redundant forward channel frame structure having a frame rate,
    wherein the offset is a multiple other than that of the frame rate.

12. The antenna system of claim 11 wherein the offset is chosen to be sufficient so as to reduce undesirable effects of signal cancellation.

13. The antenna system of claim 12 wherein the reduction in undesirable effects of signal cancellation includes a reduction in error rate.

14. The antenna system of claim 11 wherein the signals are any CDMA communications standard format that employs a redundant forward channel frame structure having a frame rate.

15. The antenna system of claim 14 wherein the offset is a multiple other than that of the frame rate.

16. The antenna system of claim 11 wherein there are three antennas and three transmitters.

17. The antenna system of claim 11 wherein the offset is greater than 30 Hz and less than 120 Hz.

18. An antenna system for a Code Division Multiple Access (CDMA) base station comprising:
    a digital beam former connectable to a plurality of transmitters; and a plurality of antennas defining a respective plurality of fixed beams which together cover a sector and connectable to the plurality of transmitters to be driven with respective CDMA signals, each CDMA signal including traffic channels unique to the respective transmitter and overhead channels common to all transmitters in the plurality of transmitters; and means in the transmitters for transmitting the CDMA signals over respective transmit frequencies that are offset from one another, wherein the signals are any CDMA communications standard format that employs a redundant forward channel frame structure having a frame rate, wherein the offset is a multiple other than that of the frame rate.

19. The antenna system of claim 18 wherein the offset is chosen to be sufficient so as to reduce undesirable effects of signal cancellation.

\* \* \* \* \*